(12) United States Patent
Suleiman et al.

(10) Patent No.: US 7,669,422 B2
(45) Date of Patent: Mar. 2, 2010

(54) COMBUSTOR LINER AND METHOD OF FABRICATING SAME

(75) Inventors: Baha Suleiman, Middletown, OH (US); Steven Clayton Vise, Loveland, OH (US); Daniel Dale Brown, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 807 days.

(21) Appl. No.: 11/460,114

(22) Filed: Jul. 26, 2006

(65) Prior Publication Data

US 2010/0011773 A1    Jan. 21, 2010

(51) Int. Cl.
F23R 3/06    (2006.01)
(52) U.S. Cl. .......................................... 60/772; 60/754
(58) Field of Classification Search ................... 60/722, 60/753, 754, 772
See application file for complete search history.

(56) References Cited

U.S. PATENT DOCUMENTS

| 3,623,711 | A | 11/1971 | Thorstenson |
| 4,872,312 | A | 10/1989 | Iizuka et al. |
| 5,233,828 | A | 8/1993 | Napoli |
| 5,241,827 | A | 9/1993 | Lampes |
| 5,590,531 | A | 1/1997 | Desaulty et al. |
| 5,850,732 | A | 12/1998 | Willis et al. |
| 6,145,319 | A | 11/2000 | Burns et al. |
| 6,205,789 | B1 | 3/2001 | Patterson et al. |
| 6,408,629 | B1 | 6/2002 | Harris et al. |
| 6,655,149 | B2 | 12/2003 | Farmer et al. |
| 7,036,316 | B2 * | 5/2006 | Howell et al. ................. 60/772 |
| 2006/0196188 | A1 * | 9/2006 | Burd et al. .................... 60/754 |

* cited by examiner

Primary Examiner—Louis J Casaregola
(74) Attorney, Agent, or Firm—William Scott Andes, Esq.; Armstrong Teasdale LLP

(57) ABSTRACT

A combustor liner includes a liner having an upstream end and a downstream end having a longitudinal axis extending therethrough, and a plurality of cooling holes formed in the liner, the cooling holes are arranged along the longitudinal axis into a plurality of circumferentially extending rows that are variably spaced apart along the longitudinal axis.

16 Claims, 4 Drawing Sheets

COMBUSTOR LINER AND METHOD OF FABRICATING SAME

BACKGROUND OF THE INVENTION

This invention relates generally to film cooled combustor liners for use in gas turbine engines, and more particularly, to such combustor liners having regions with closely spaced cooling holes.

Combustors used in aircraft engines typically include inner and outer combustor liners to protect the combustor and surrounding engine components from the intense heat generated by the combustion process. A variety of approaches have been proposed to cool combustor liners so as to allow the liners to withstand greater combustion temperatures. One such approach is multi-hole film cooling wherein a thin layer of cooling air is provided along the combustion side of the liners by an array of very small cooling holes formed through the liners. Multi-hole film cooling reduces the overall thermal load on the liners because the mass flow through the cooling holes dilutes the hot combustion gas next to the liner surfaces, and the flow through the holes provides convective cooling of the liner walls.

However, multi-hole film cooling is more difficult to design compared to pure nugget cooling due to the many restrictions associated with it, such as, the limitations on the spacing between holes, the number of holes in each row of multi-holes, the limitations on hole sizes, and difficulty of doing preferential cooling, for example. Specifically, to provide adequate cooling, the holes should be spaced an adequate distance from each other to facilitate applying the thermal-barrier coating (TBC) to the combustor, and should also be spaced sufficiently close to each other to establish good film and convective cooling.

For example, to achieve adequate combustor cooling, at least one known combustor includes cooling holes that are spaced equidistantly in an axial direction and no attempt is made to control the circumferential spacing. However, since many liner contours have changing slopes, the circumferential spacing may vary uncontrollably, resulting in liners having areas that are overcooled and other areas that are undercooled. Moreover, circumferential preferential multihole cooling is difficult to fabricate because it requires variable circumferential spacing, which may cause interference among multihole rows. Additionally, varying hole sizes is a possibility for circumferential preferential cooling, but it is relatively difficult to maintain the axial and circumferential distances between holes within the design limitations and also introduces additional cost.

Accordingly, there is a need for a combustor liner in which cooling film effectiveness is increased in the areas of the liner that are subject to unusually high temperatures and resulting material distress.

BRIEF DESCRIPTION OF THE INVENTION

In one aspect, a combustor liner is provided. The combustor liner includes an upstream end and a downstream end having a longitudinal axis extending therethrough, and a plurality of cooling holes formed in the liner, the cooling holes arranged along the longitudinal axis into a plurality of circumferentially extending rows that are variably spaced apart along the longitudinal axis.

In another aspect, a gas turbine engine assembly is provided. The gas turbine engine assembly includes a compressor, and a combustor coupled in flow communication with said compressor, said combustor comprising at least one combustor liner having an upstream end and a downstream end having a longitudinal axis extending therethrough, and a plurality of cooling holes formed in said liner, said cooling holes arranged along the longitudinal axis into a plurality of circumferentially extending rows that are variably spaced apart along the longitudinal axis.

In a further aspect, a method of fabricating a gas turbine engine combustor liner. The method includes providing a liner having an upstream end and a downstream end and having a longitudinal axis extending therethrough, and forming a plurality of cooling holes in the liner such that the plurality of holes are arranged along the longitudinal axis into a plurality of circumferentially extending rows that are variably spaced apart along the longitudinal axis.

DETAILED DESCRIPTION OF THE INVENTION

Figure 1:
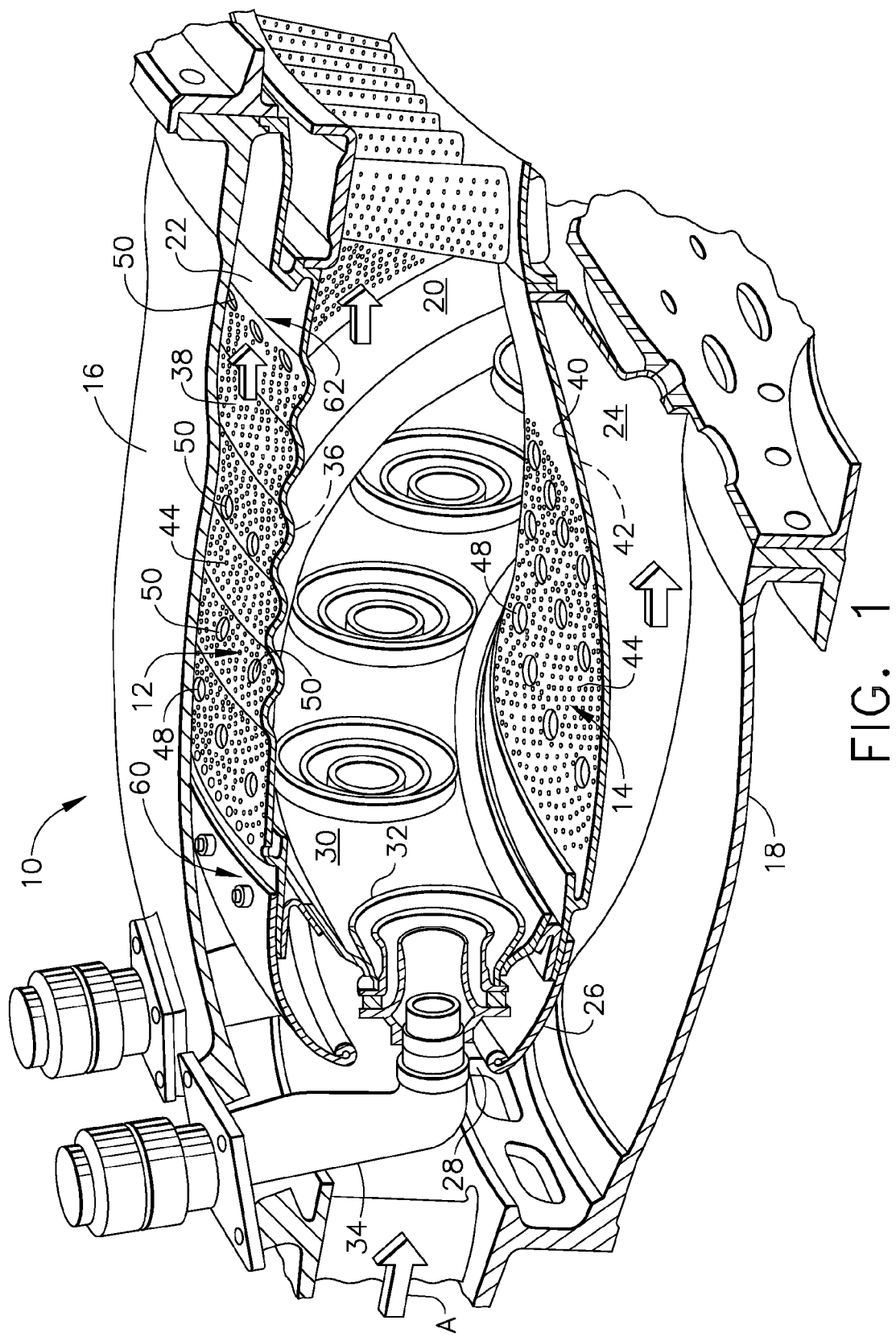
FIG. 1 is a cutaway perspective view of a gas turbine combustor having combustor liners of the present invention.

FIG. 1 illustrates a combustor 10 of the type suitable for use in a gas turbine engine. Combustor 10 includes an outer liner 12 and an inner liner 14 disposed between an outer combustor casing 16 and an inner combustor casing 18. Outer and inner liners 12 and 14 are radially spaced from each other to define a combustion chamber 20. Outer liner 12 and outer casing 16 form an outer passage 22 therebetween, and inner liner 14 and inner casing 18 form an inner passage 24 therebetween. A cowl assembly 26 is mounted to the upstream ends of outer and inner liners 12 and 14. An annular opening 28 is formed in cowl assembly 26 for the introduction of compressed air into combustor 10. The compressed air is supplied from a compressor (not shown) in a direction generally indicated by arrow A of FIG. 1. The compressed air passes principally through annular opening 28 to support combustion and partially into outer and inner passages 22 and 24 where it is used to cool the liners 12 and 14.

Disposed between and interconnecting the outer and inner liners 12 and 14 near their upstream ends is an annular dome plate 30. A plurality of circumferentially spaced swirler assemblies 32 are mounted in dome plate 30. Each swirler assembly 32 receives compressed air from annular opening 28 and fuel from a corresponding fuel nozzle 34. The fuel and air are swirled and mixed by swirler assemblies 32, and the resulting fuel/air mixture is discharged into combustion chamber 20. The combustor has an upstream end 60 and a downstream end 62 which define a longitudinal axis extending therethrough (not shown in FIG. 1), which in the case of an annular combustor is coincident with the longitudinal axis of the engine. It is noted that although FIG. 1 illustrates one preferred embodiment of a single annular combustor, the present invention is equally applicable to any type of combustor, including double annular combustors, which uses multi-hole film cooling or can-annular combustors.

Outer and inner liners 12 and 14 each comprise a single wall, metal shell having a generally annular and axially extending configuration. Outer liner 12 has a hot side 36 facing the hot combustion gases in combustion chamber 20 and a cold side 38 in contact with the relatively cool air in outer passage 22. Similarly, inner liner 14 has a hot side 40 facing the hot combustion gases in combustion chamber 20 and a cold side 42 in contact with the relatively cool air in inner passage 24. Both liners 12 and 14 include a large number of closely spaced cooling holes 44 formed therein.

Dilution air is introduced into combustor chamber 20 through a plurality of circumferentially spaced dilution holes 48 that are disposed in each of outer and inner liners 12 and 14. Dilution holes 48 are generally far smaller in number than the cooling holes 44, and each dilution hole 48 has a cross-sectional area that is substantially greater than the cross-sectional area of one of the cooling holes 44. Dilution holes 48 serve to admit dilution air into combustor chamber 20. The dilution holes are arranged in circumferentially extending bands or rows 50 around the periphery of the liners 12 and 14. The forward-most band of dilution holes 48 are referred to as primary dilution holes.

In the assembled combustor, certain ones of the primary dilution holes 48 are aligned with the injection points defined by the circumferential location of the center of the fuel nozzles 34 and swirlers 32. In operation, the flow of combustion gases past these circumferential locations may create "hot streaks" of locally increased material temperatures. These streaks are not strictly longitudinal; because of the swirl of the flow in the combustor caused by the swirlers 32, the streaks are curved in the circumferential direction when viewed along the length of the combustor. Although the prior art cooling provisions provide adequate cooling for the other portions of the combustor liners 12 and 14, the portions of the combustor liners 12 and 14 subject to hot streaks can exhibit oxidation, corrosion and low cycle fatigue (LCF) failures from field use.

Figure 2:
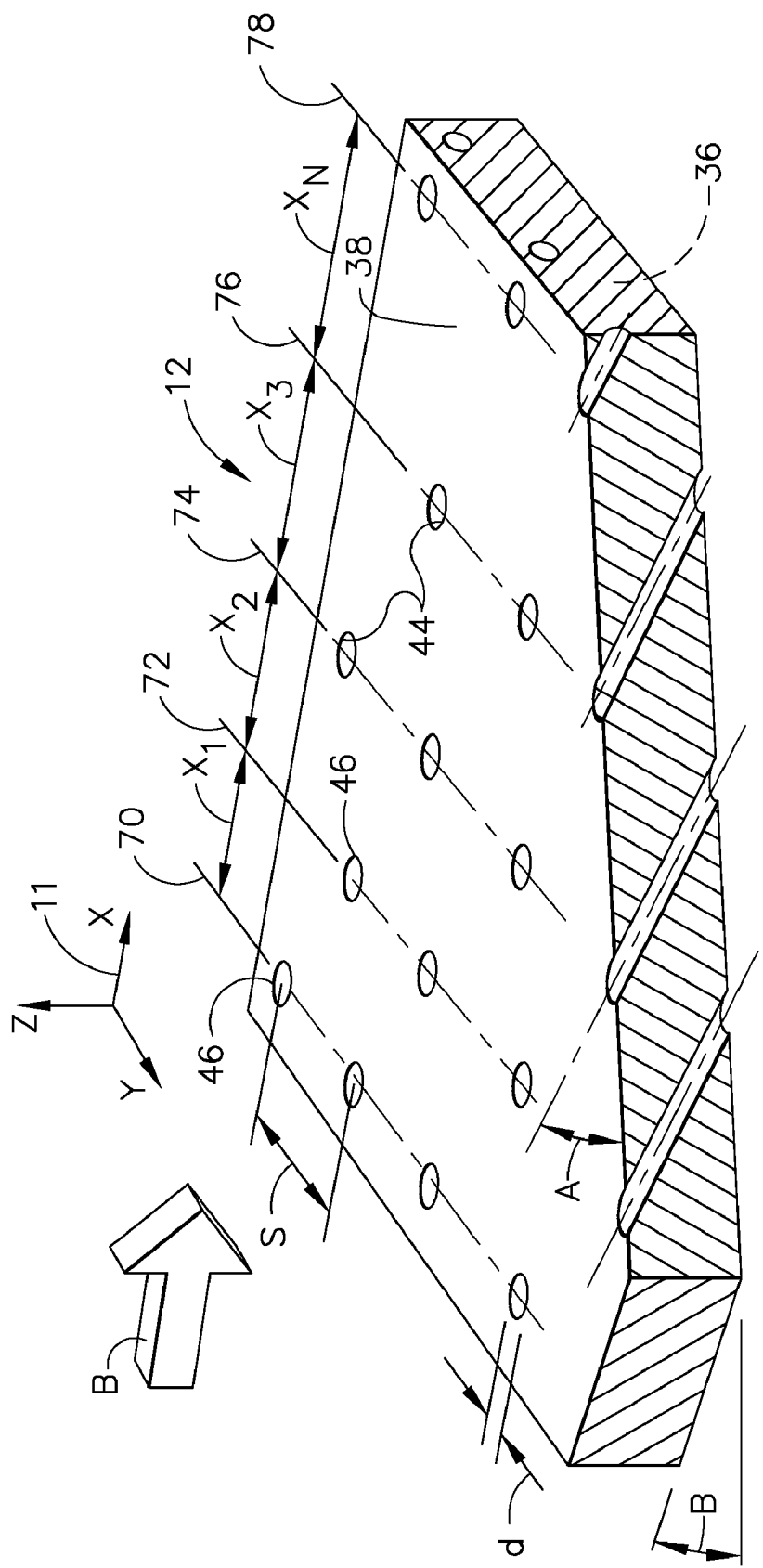
FIG. 2 is a perspective view of a portion of a combustor liner depicting angled multi-hole cooling holes.

Referring now to FIG. 2, wherein cooling holes 44 that are disposed through a portion of outer liner 12 are shown in more detail. Although FIG. 2 depicts cooling holes in outer liner 12, it should be understood that the configuration of cooling holes of inner liner 14 is substantially identical to that of outer liner 12. As such, the following description will also apply to inner liner 14. FIG. 2 includes a frame of reference having axes labeled X, Y and Z, wherein X is the downstream axial distance along the longitudinal axis 11 (also indicated by arrow B) of combustor 10, Y is the circumferential direction, and Z is a radial direction. Cooling holes 44 are axially slanted from cold side 38, to hot side 36 at a downstream angle A, which is preferably in the range of approximately 15 degrees to approximately 20 degrees. Cooling holes 44 are arranged in a series of circumferentially extending rows, 46, wherein adjacent holes 44 in each row have a circumferential hole spacing S, between their respective centerlines. Specifically, and in the exemplary embodiment, each respective cooling hole 44 has a diameter (d) and is separated in the circumferential direction (Y) by the distance (S) from adjacent cooling holes 44. As such, the exemplary combustor described herein includes cooling holes 44 that are all spaced apart approximately equidistantly in the circumferential direction, i.e. S is constant in the Y direction and have approximately the same diameter (d).

In the exemplary embodiment, the rows 46 of cooling holes 44 are variably spaced in the axial direction (X). More specifically, the cooling holes 44 are generally arranged into a plurality of rows 46 that include, for example, a first row 70, a second row 72, a third row 74, a fourth row 76, and an nth row 78 that are variably spaced axially through outer liner 12. As shown in FIG. 2, first row 70 is formed a distance $X_1$ from second row 72, second row 72 is formed a distance $X_2$ from third row 74, third row 74 is formed a distance $X_3$ from fourth row 76, and fourth row 76 is formed a distance $X_N$ from nth row 78. In the exemplary embodiment, the rows 46 of cooling holes 44 are axially spaced at various distances such as, for example, $X_1 \neq X_2 \neq X_3 \neq X_N$ to allow an increased flow of cooling air to be directed to an area of the combustor where increased cooling air is desired.

Figure 3:
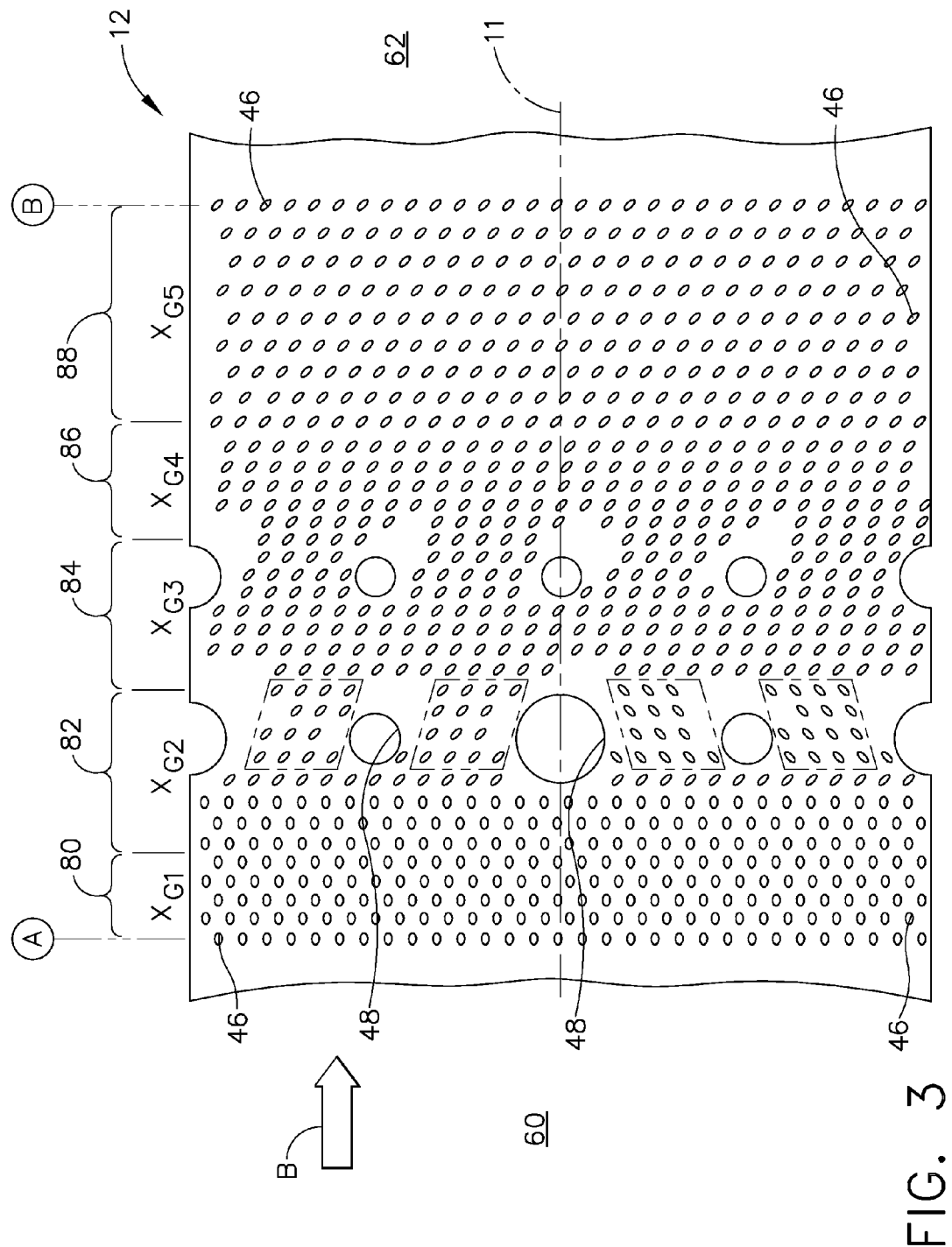
FIG. 3 is a top view of a portion of a combustor liner depicting the arrangement of the multi-hole cooling holes of the present invention.
Figure 4:
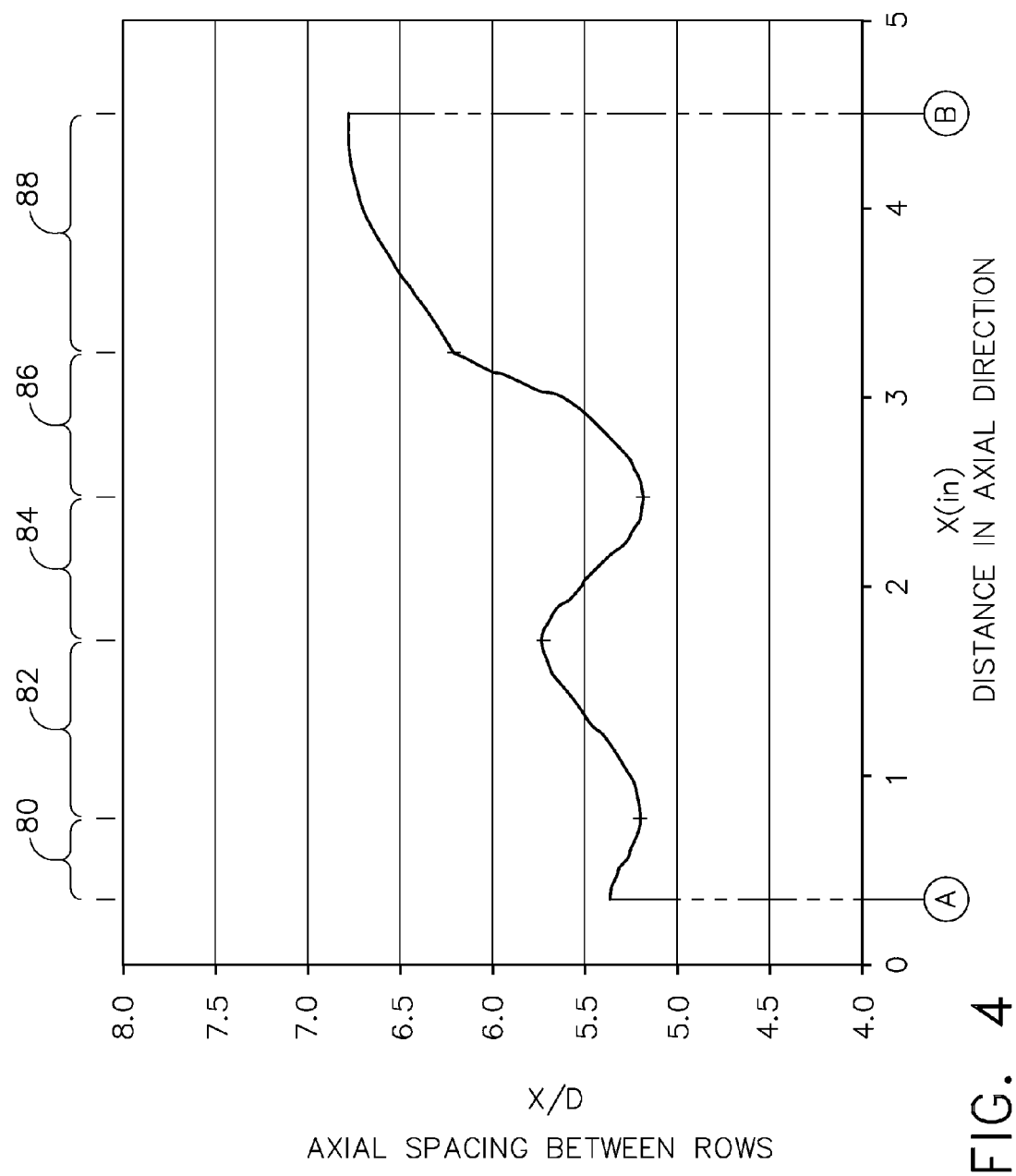
FIG. 4 is a graphical illustration of the variably spaced rows of cooling holes shown in FIG. 3.

For example, FIG. 3 illustrates the combustor liner 12 wherein the rows 46 of cooling holes 44 that are variably spaced apart to either increase or decrease the cooling airflow to selected portions of the combustor liner 12. FIG. 4 is a graphical illustration of hole spacing along the longitudinal axis 11 that is discussed in conjunction with FIG. 3 to illustrate the cooling hole spacing shown in FIG. 3.

In this embodiment, a first group 80 of rows 46 are variably spaced such that the spacing $X_{G1}$ between adjacent rows 46 is gradually decreasing in the axial direction (X) from the upstream end 60 of the combustor liner 12 at least partially rearwardly toward the downstream end 62 of the combustor liner 12. For example, as shown in FIG. 4, the row spacing X/d of the first group 80 is gradually decreasing, i.e. the rows are gradually spaced closer together, such that the cooling airflow supplied through the rows 46 of cooling holes in the first group 80 is gradually increasing to facilitate providing an increased flow of cooling air to potential hot spots that may occur upstream from the first row of dilution holes 48.

A second group 82 of rows 46 are variably spaced such that the spacing $X_{G2}$ between adjacent rows 46 is gradually increasing in the axial direction (X) from the first group of rows 80 formed through the combustor liner 12 at least partially rearwardly toward the downstream end 62 of the combustor liner 12. For example, as shown in FIG. 4, the row spacing X/d of the second group 82 is gradually increasing, i.e. the rows are gradually spaced further apart together, such that the cooling airflow supplied through the rows 46 of cooling holes in the second group 82 is gradually decreasing to facilitate providing a decreased flow of cooling air to areas of the combustion liner 12 which do not include potential hot spots.

The third group 84 of rows 46 are variably spaced such that the spacing $X_{G3}$ between adjacent rows 46 is gradually decreasing in the axial direction (X) from the second group 82 of cooling holes formed through the combustor liner 12 at least partially rearwardly toward the downstream end 62 of the combustor liner 12. For example, as shown in FIG. 4, the row spacing X/d of the third group 84 is gradually decreasing, i.e. the rows are gradually spaced closer together, between the rows of dilution holes 46 such that the cooling airflow supplied through the rows 46 of cooling holes in the third group 82 is gradually increasing to facilitate providing an increased flow of cooling air to potential hot spots that may occur between the rows of dilution holes 46.

A fourth group 86 of rows 46 are variably spaced such that the spacing $X_{G4}$ between adjacent rows 46 is gradually decreasing in the axial direction (X) from the third group 84 of cooling holes formed through the combustor liner 12 at least partially rearwardly toward the downstream end 62 of the combustor liner 12. For example, as shown in FIG. 4, the row spacing X/d of the fourth group 84 is gradually increasing, i.e. the rows are gradually spaced further apart, downstream from the dilution holes 46 such that the cooling airflow supplied through the rows 46 of cooling holes in the fourth group 82 is gradually decreasing in response to the decreased requirement for airflow cooling downstream from the dilution holes 46. Moreover, a fifth group 88 of rows 46 are variably spaced such that the spacing $X_{G5}$ between adjacent rows 46 is further increasing in the axial direction (X) downstream from the fourth group of holes 86 illustrating the further decrease in cooling requirements toward the downstream end 62 of combustor liner 12.

Described herein, a combustor liner that includes a plurality of rows of cooling holes that are variably spaced in the axial direction. More specifically, to facilitate increasing the multihole cooling at the axial stations that need more cooling, the axial spacing between at least some of rows 46 is varied. This is achieved by distributing the axial hole spacing (X/d) smoothly along the combustion liner in the axial direction (X), as shown in FIG. 4, utilizing a smoothing function, such as a sine or linear function, for example. As such, the smoothing function facilitates minimizing any abrupt spacing changes between adjacent rows 46 of cooling holes 44. For example, one smoothing function that may be utilized is A sin(Bx−C) where A, B, and C are chosen to taylor the hole spacing based on the location of the hot spots of the liner, although it should be realized that other smoothing functions may also be utilized.

Moreover, the number of multihole rows 46 and the number of holes 44 in each row 46 are chosen, along with the variable X/d functions, to control S/d, which is fixed for each row. A combination of complete X/d control and limited S/d control allows the designer to distribute the cooling air per unit area axially in any desired fashion. The design process also ensures that no interference occurs between adjacent holes 44 by calculating and constraining the aspect ratio of the hole spacing (S/x) to be preferably close to a value of one. Furthermore, with a smooth axial multihole spacing, only a single hole size is needed, which is a manufacturing convenience. Additionally, the method of fabricating the liners described herein allows a limited controllable preferential cooling and eliminates the risk of the multihole interference. It also provides an axially variable cooling air per unit area to target hot spots or control the liner profile and reduces cost of both design and manufacturing processes. This method has been demonstrated using computational-fluid dynamics (CFD). It was demonstrated that preferential cooling helped to reduce hot-spot gas temperatures locally. The success of the above-described concept was demonstrated in a high-pressure sector combustor rig and a full-annular combustor rig.

The method of fabricating the combustor liner includes providing a liner having an upstream end and a downstream end having a longitudinal axis extending therethrough, and forming a plurality of cooling holes in the liner such that the plurality of holes are arranged along the longitudinal axis into a plurality of circumferentially extending rows that are variably spaced apart along the longitudinal axis. As such, the liner described herein enables using one multihole size for preferential cooling which is a design and manufacturing convenience. However, it should be realized that the liner described herein may be utilized with other means of preferential cooling, for example, multiple hole sizes.

The foregoing has described a multi-hole film cooled combustor liner having an improved arrangement of cooling holes to reduce temperature, temperature gradients, and hot streaks within the combustor. While the invention has been described in terms of various specific embodiments, those skilled in the art will recognize that the invention can be practiced with modification within the spirit and scope of the claims.

What is claimed is:

1. A combustor liner comprising:
   a liner comprising an upstream end and a downstream end having a longitudinal axis extending therethrough; and
   a plurality of cooling holes formed in said liner, said cooling holes arranged along the longitudinal axis into a plurality of circumferentially extending rows that are variably spaced apart along the longitudinal axis;
   a first row of dilution holes; and
   a second row of dilution holes formed downstream from said first row of dilution holes, said plurality of cooling holes are arranged along the longitudinal axis into a plurality of circumferentially extending rows between said first and second rows of dilution holes and variably spaced apart along the longitudinal axis such that the spacing is at least one of gradually increasing and gradually decreasing from the first row of dilution holes downstream to the second row of dilution holes.

2. The combustor liner in accordance with claim 1, wherein said plurality of cooling holes each have the same diameter.

3. The combustor liner in accordance with claim 1, wherein said plurality of cooling holes are equidistantly spaced in a circumferential direction within a single row.

4. The combustor liner in accordance with claim 1, wherein said rows of cooling holes are arranged in at least one group, the axial spacing between adjacent rows gradually increasing in a downstream direction along the longitudinal axis.

5. The combustor liner in accordance with claim 1, wherein said plurality of cooling holes are axially slanted at an angle that is between approximately fifteen degrees and approximately twenty degrees.

6. The combustor liner in accordance with claim 1, wherein said plurality of cooling holes are arranged along the longitudinal axis into a plurality of circumferentially extending rows that are variably spaced apart along the longitudinal axis such that the spacing is gradually decreasing from the liner the upstream end at least partially towards the liner downstream end.

7. A gas turbine engine assembly comprising:
   a compressor; and
   a combustor coupled in flow communication with said compressor, said combustor comprising:
   at least one combustor liner having an upstream end and a downstream end having a longitudinal axis extending therethrough;
   a plurality of cooling holes formed in said liner, said cooling holes arranged along the longitudinal axis into a plurality of circumferentially extending rows that are variably spaced apart along the longitudinal axis;
   a first row of dilution holes; and
   a second row of dilution holes formed downstream from said first row of dilution holes, said plurality of cooling holes are arranged along the longitudinal axis into a plurality of circumferentially extending rows between said first and second rows of dilution holes and variably spaced apart along the longitudinal axis such that the spacing is at least one of gradually increasing and gradually decreasing from the first row of dilution holes downstream to the second row of dilution holes.

8. The gas turbine engine assembly in accordance with claim 7, wherein said plurality of cooling holes each have the same diameter.

9. The gas turbine engine assembly in accordance with claim 7, wherein said plurality of cooling holes are equidistantly spaced in a circumferential direction within a single row.

10. The gas turbine engine assembly in accordance with claim 7, wherein said plurality of rows of cooling holes are arranged in at least one group, the axial spacing between adjacent rows gradually increasing in a downstream direction along the longitudinal axis.

11. The gas turbine engine assembly in accordance with claim 7, wherein said cooling holes are axially slanted at an angle that is between approximately fifteen degrees and approximately twenty degrees.

12. The gas turbine engine assembly in accordance with claim 7, wherein said plurality of cooling holes are arranged along the longitudinal axis into a plurality of circumferentially extending rows that are variably spaced apart along the longitudinal axis such that the spacing is gradually decreasing from the liner upstream end at least partially towards the liner downstream end.

13. A method of fabricating a gas turbine engine combustor liner, said method comprising:
providing a liner having an upstream end and a downstream end having a longitudinal axis extending therethrough; and
forming a plurality of cooling holes in the liner such that the plurality of holes are arranged along the longitudinal axis into a plurality of circumferentially extending rows that are variably spaced apart along the longitudinal axis;
forming a first row of dilution holes in the liner; and
forming a second row of dilution holes downstream from the first row of dilution holes, the plurality of cooling holes are arranged along the longitudinal axis into a plurality of circumferentially extending rows between the first and second rows of dilution holes and variably spaced apart along the longitudinal axis such that the spacing is at least one of gradually increasing and gradually decreasing from the first row of dilution holes downstream to the second row of dilution holes.

14. The method in accordance with claim 13, further comprising forming the plurality holes such that the plurality of holes are equidistantly spaced in a circumferential direction and have the same diameter.

15. The method in accordance with claim 13, further comprising forming the plurality holes such that the plurality of holes are axially slanted at an angle that is between approximately fifteen degrees and approximately twenty degrees.

16. The method in accordance with claim 13, further comprising forming the plurality of holes such that the spacing between adjacent rows is gradually decreasing from the liner upstream end at least partially towards the liner downstream end.

* * * * *